(12) United States Patent
Valsecchi et al.

(10) Patent No.: US 11,276,990 B2
(45) Date of Patent: Mar. 15, 2022

(54) ELECTRICAL CABINET

(71) Applicant: ABB S.p.A., Milan (IT)

(72) Inventors: Davide Valsecchi, Seregno (IT);
Simone Angelo Proserpio, Eupilio (IT)

(73) Assignee: ABB S.P.A., Milan (IT)

( * ) Notice: Subject to any disclaimer, the term of this patent is extended or adjusted under 35 U.S.C. 154(b) by 0 days.

(21) Appl. No.: 16/381,352

(22) Filed: Apr. 11, 2019

(65) Prior Publication Data
US 2019/0326734 A1 Oct. 24, 2019

(30) Foreign Application Priority Data
Apr. 19, 2018 (EP) .................................... 18168153

(51) Int. Cl.
| | |
|---|---|
| *H02B 1/38* | (2006.01) |
| *E05D 5/02* | (2006.01) |
| *E05D 3/02* | (2006.01) |
| *E05D 5/12* | (2006.01) |
| *E05D 7/02* | (2006.01) |
| *E05D 5/10* | (2006.01) |

(52) U.S. Cl.
CPC .................. *H02B 1/38* (2013.01); *E05D 3/02* (2013.01); *E05D 5/0276* (2013.01); *E05D 5/12* (2013.01); *E05D 7/02* (2013.01); *E05D 2005/102* (2013.01); *E05Y 2900/208* (2013.01)

(58) Field of Classification Search
CPC .. E05D 5/065; E05D 5/12; E05D 3/02; E05D 5/0276; E05D 5/128; E05D 7/1061; E05D 2005/102; E05D 7/02; H02B 1/38; E05Y 2900/208

USPC ......................................................... 361/622
See application file for complete search history.

(56) References Cited

U.S. PATENT DOCUMENTS

| | | | | |
|---|---|---|---|---|
| 2,778,053 | A | | 1/1957 | Hess et al. |
| 4,827,568 | A | * | 5/1989 | Ramsauer ............... E05D 5/065 16/254 |
| 4,864,466 | A | * | 9/1989 | Gasparetto ............... H02B 1/14 361/605 |
| 4,873,745 | A | * | 10/1989 | Ramsauer ................. E05D 7/10 16/258 |

(Continued)

FOREIGN PATENT DOCUMENTS

| | | |
|---|---|---|
| EP | 0274549 A1 | 7/1988 |
| EP | 0628688 A2 | 12/1994 |

(Continued)

OTHER PUBLICATIONS

European Patent Office, Extended Search Report issued in corresponding Application No. 18168153.7, dated Oct. 19, 2018, 9 pp.

*Primary Examiner* — Anatoly Vortman
(74) *Attorney, Agent, or Firm* — Greenberg Traurig, LLP

(57) ABSTRACT

An electrical cabinet includes a frame hinge fixed to a frame of the cabinet and a door hinge fixed to a door of the cabinet. The frame hinge forms an insertion window for receiving the door hinge. A hinge pin is inserted through aligned seats of the frame hinge. The door hinge is inserted into the insertion window around the hinge pin. A blocking screw or pin is inserted through a third seat in a direction substantially perpendicular to the hinge pin to block the hinge pin and secure the door to the frame.

20 Claims, 11 Drawing Sheets

(56) References Cited

U.S. PATENT DOCUMENTS

| | | | |
|---|---|---|---|
| 6,525,929 B2* | 2/2003 | Carr | G06F 1/181 |
| | | | 312/223.2 |
| 6,721,994 B2* | 4/2004 | Bowman | E05D 5/023 |
| | | | 16/262 |
| 6,746,092 B2* | 6/2004 | Leccia | H02B 1/38 |
| | | | 292/300 |
| 7,735,261 B2* | 6/2010 | Sellati | E05C 19/006 |
| | | | 292/DIG. 11 |
| 7,932,804 B2* | 4/2011 | Buettner | H01H 85/205 |
| | | | 337/196 |
| 8,147,015 B2* | 4/2012 | Kim | E05D 5/12 |
| | | | 16/262 |
| 8,960,815 B2* | 2/2015 | Karandikar | H02B 1/28 |
| | | | 312/222 |
| 9,627,860 B2* | 4/2017 | Proserpio | H02B 1/013 |
| 9,745,794 B2* | 8/2017 | Ellingson | E06B 7/2309 |
| 10,017,973 B2* | 7/2018 | Hoschler | E05D 7/1066 |
| 2003/0151337 A1* | 8/2003 | Leccia | H02B 1/38 |
| | | | 312/326 |

FOREIGN PATENT DOCUMENTS

| | | | | |
|---|---|---|---|---|
| WO | 2006136939 A2 | 12/2006 | | |
| WO | WO-2019034441 A1 * | 2/2019 | | E05D 7/0415 |

* cited by examiner

ELECTRICAL CABINET

BACKGROUND

The present invention relates to an electrical cabinet, in particular an electrical cabinet for low voltage equipment, such as for instance a low voltage electrical switchboard, which has improved functions and characteristics.

Cabinets for low-voltage electrical distribution panels are generally provided with a structure shaped like a parallelepiped, inside which there is an adequate space suitable to accommodate the components of the panel. The frame of the cabinet allows the anchoring of the elements that support said components, of the cladding panels and of the door of the cabinet. In order to keep separated, for safety reasons, the busbars from the front volume of the switchboard into which the apparatuses are housed, an insulating partition is normally provided in the switchboard.

On the front side of the switchboard cabinet there is usually provided an apparatus compartment in which one or more electrical apparatuses, e.g., circuit breakers, switches, pushbuttons, control instruments and similar apparatuses, are housed. In some cases, one or more of said electrical apparatuses are housed in a drawer that can be extracted from and inserted into a connection position with the busbars inside the switchboard.

In practice, the conventional cabinets for electrical switchboard normally comprise a supporting structure having a base and a top which are structurally connected by vertical uprights, thereby forming a frame for the cabinet. A number of plates are provided inside the switchboard to create a partition between the busbar compartment and the apparatus compartment located on the front of the switchboard. In the apparatus compartment, a number of electrical apparatuses are housed, some of them being possibly positioned on one or more drawers that can be extracted from and inserted into a connection position with the busbars inside the switchboard.

In order to allow accessibility to the internal space of the cabinet, e.g. to the apparatus compartment, a door is normally hingedly attached to the frame of the cabinet on the front side thereof.

At the current state of the art, the existing electrical cabinet, e.g. for low voltage switchboards, have a number of disadvantages that it would be desirable to overcome.

In particular, the assembly of the various components of the frame as well as of the front door in the operating site may be sometimes cumbersome, due also to the fact that the cabinets are normally located in little spaces where the operator may have difficulties to move themselves around.

This is particularly true for the front door that may have a height of the order of a couple of meters and that is relatively heavy. The hinging of the door of the frame of the cabinet may be therefore particularly difficult for the operator.

Moreover, the structure of the hinging systems should be sufficiently strong to withstand the weight of the door and possible further mechanical loads.

In general hinging systems of conventional electrical cabinet are formed by a relatively high number of parts which are relatively costly to be produce, make difficult their assembly, and increase the installation times, risks and costs.

It is clear from the above that the existing solutions for the hinging systems in an electrical cabinet are clearly disadvantageous in so far as they involve high installation times and costs.

SUMMARY

Hence, the present disclosure is aimed at providing an electrical cabinet, in particular a cabinet for a low voltage switchboard, which allows overcoming at least some of the above-mentioned shortcomings.

In particular, the present invention is aimed at providing an electrical cabinet, in particular a cabinet for a low voltage switchboard, in which the installation time, and in particular the installation time of the front door are greatly reduced.

Furthermore, the present invention is aimed at providing an electrical cabinet, in particular a cabinet for a low voltage switchboard, in which the hinging system of the front door has a reduced number of components.

Moreover, the present invention is aimed at providing an electrical cabinet, in particular a cabinet for a low voltage switchboard, in which the hinging system of the front door can be mounted so as to allow left-opening or right opening of the door with respect to the frame of the cabinet.

In addition, the present invention is aimed at providing an electrical cabinet, in particular a cabinet for a low voltage switchboard, in which the hinging system of the front door is easy to mount and at the same time is sufficiently strong to withstand the mechanical loads to which it is subject.

Also, the present invention is aimed at providing an electrical cabinet, in particular a cabinet for a low voltage switchboard, that is reliable and relatively easy to produce at competitive costs.

Thus, the present invention relates to an electrical cabinet, in particular an electrical cabinet for low-voltage switchboards, which comprises a frame that defines an internal space and an openable door for accessing said internal space hingedly attached to said frame by hinging means, said hinging means comprising at least a frame hinge fixed to said frame and a corresponding door hinge fixed to said door. The electrical panel according to the present disclosure is characterized in that said frame hinge comprises a first shaped body having a first fixing plate fixed to said frame, a first and a second hinge wings protruding from said first fixing plate opposite to said frame and forming an insertion window in said first shaped body, said first and second hinge wings having respectively a first and a second seat aligned in a direction parallel to said first fixing plate and positioned at the end of said insertion window. The electrical panel according to the present disclosure is further characterized in that said door hinge comprises a second shaped body having a second fixing plate fixed to said door, a third hinge wing protruding from said second fixing plate opposite to said door and forming a housing space in said second shaped body, said third hinge wing being inserted into said insertion window of said first shaped body and being provided with a third seat. Furthermore, the electrical panel according to the present disclosure is characterized in that said hinging means further comprise a first hinge pin inserted into said first and second seats of said first and second hinge wings and closing said insertion window, and also comprise first blocking means inserted into said third seat in a direction substantially perpendicular to said first hinge pin, said first blocking means closing said housing space in said second shaped body and blocking said first hinge pin.

As better explained in the following description, thanks to the particular structure of the electrical cabinet of the present invention, the above-mentioned problems can be avoided, or at least greatly reduced.

Indeed, the structure of the door hinging system used in the electrical cabinet of the present invention is formed by a very limited number of pieces which can be assembled to the frame structure of the cabinet very easily and in short times.

As better explained in the following description, in a typical embodiment of the present invention, the structure of the door hinging system is formed only by four main components that can be fixed to the frame of the cabinet and to the door thereof and then coupled to each other very quickly and with a limited number of operations.

In a preferred embodiment of the electrical cabinet, according to the present invention, the frame hinge of the door hinging system, and in particular the first shaped body of the frame hinge, is substantially C shaped with a cut-out portion between said first and a second hinge wing.

In a typical embodiment of the electrical cabinet, according to the present invention, the first and second hinge wings are provided with a first and a second seat which can be conveniently a first and a second through-holes respectively formed in said first and a second hinge wing at the end of said insertion window. Alternatively, the first and a second seat can be formed by wrapping the terminal portion of said first and second hinge wings around a wrapping axis parallel to said fixing plate so as two create two superimposed, substantially cylindrical seats aligned along said wrapping axis.

Fixing of the door hinging system to the frame of the cabinet and to the door can be conveniently made by using suitable fixing means.

In a typical embodiment of the electrical cabinet, according to the present invention, the door hinging system can conveniently comprise first fixing means which are positioned on the first fixing plate of the frame hinge and which connect said frame hinge to the frame of said electrical cabinet.

Typically, the first fixing means can be screw means fixed in corresponding holes formed in the first fixing plate of the frame hinge and in the frame of the cabinet.

In order to make easier and faster the positioning and fixing of the frame hinge during the assembly operations, said frame hinge—and in particular the first fixing plate thereof—can comprise centering means, such as one or more centering protrusions, which engage corresponding holes formed in the frame of the cabinet.

According to a largely preferred embodiment of the electrical cabinet of the present disclosure, said third hinge wing of said door hinge preferably has a terminal end which is flattened and substantially parallel to said second fixing plate.

In other words—in a typical exemplary embodiment of the presently disclosed electrical cabinet—the third hinge wing of the door hinge protrudes from the second fixing plate and can be conveniently provided with a distal end which is fixed on said second fixing plate and with a terminal end which is flattened and substantially parallel to said second fixing plate, a housing space being formed in said second shaped body between said second fixing plate and the terminal end of said third hinge wing.

In a typical embodiment of the electrical cabinet, according to the present invention, the third hinge wing can be provided with a third seat which can be conveniently a third through hole which is formed in said third hinge wing.

Furthermore, as better explained in the following detailed description, in a largely preferred embodiment of the electrical cabinet of the present invention, the third hinge wing of the door hinge can be can be provided with a third seat which can be a third through hole formed in the terminal end of said third hinge wing.

In a typical embodiment of the electrical cabinet, according to the present invention, the door hinging system—and in particular said door hinge—can conveniently comprise second fixing means which are positioned on said second fixing plate and connect said door hinge to the door of said electrical cabinet.

Typically, the second fixing means can be screw means which are suitably fixed in corresponding holes formed in the second fixing plate of the door hinge and in the door of the cabinet. Other fixing means, e.g. snap-fit fixing means, can be chosen and used, depending on the needs.

In a typical exemplary embodiment of the presently disclosed electrical cabinet, said first hinge pin can have a substantially cylindrical body and is provided with an enlarged head, thereby helping the insertion of said first hinge pin into said first and second seats of said first and second hinge wings and its maintaining in place.

In such a case, said first hinge pin can conveniently have a tapered portion in an intermediate position of said substantially cylindrical body.

Furthermore, as better explained in the following detailed description, in a largely preferred embodiment of the electrical cabinet of the present invention, said first blocking means are at least partially positioned in the tapered portion of the substantially cylindrical body of said first hinge pin.

In other words, as better explained hereinafter, the first blocking means can engage the first hinge pin in correspondence of the tapered portion of the substantially cylindrical body, thereby locking it into its inserted position in the first and second seats of said first and second hinge wings.

In a first typical embodiment of the electrical cabinet, according to the present invention, the first blocking means of the hinge system can conveniently comprise a socket set screw; said third seat can therefore be a threaded third through hole which is formed in said third hinge wing.

Alternatively, in a second typical embodiment of the electrical cabinet, according to the present invention, the first blocking means of the hinge system can conveniently comprise a second hinge pin and a spring positioned in said third hinge wing. In other words, according to this embodiment, the first blocking means of the hinge system—instead of being screwed into their final position—are pushed and maintained into said position by spring means, thereby making even easier and faster the assembly of the electrical cabinet according to the present invention.

In a particular embodiment of the electrical cabinet, according to the present invention, the hinging system can be provided with grounding means for the panel. For instance, the door hinge can be provided with a tip protruding onto the edge of the door to create the panel grounding.

In a further typical exemplary embodiment of the presently disclosed electrical cabinet, said door hinge can be conveniently provided with a fourth seat which is aligned with said third seat in a direction substantially perpendicular to said first hinge pin and which houses a terminal end of said first blocking means.

BRIEF DESCRIPTION OF THE DRAWINGS

Further features and advantages of the present invention will be more clear from the description of preferred but not exclusive embodiments of an electrical cabinet, shown by way of examples in the accompanying drawings, wherein.

DETAILED DESCRIPTION

Figure 1:
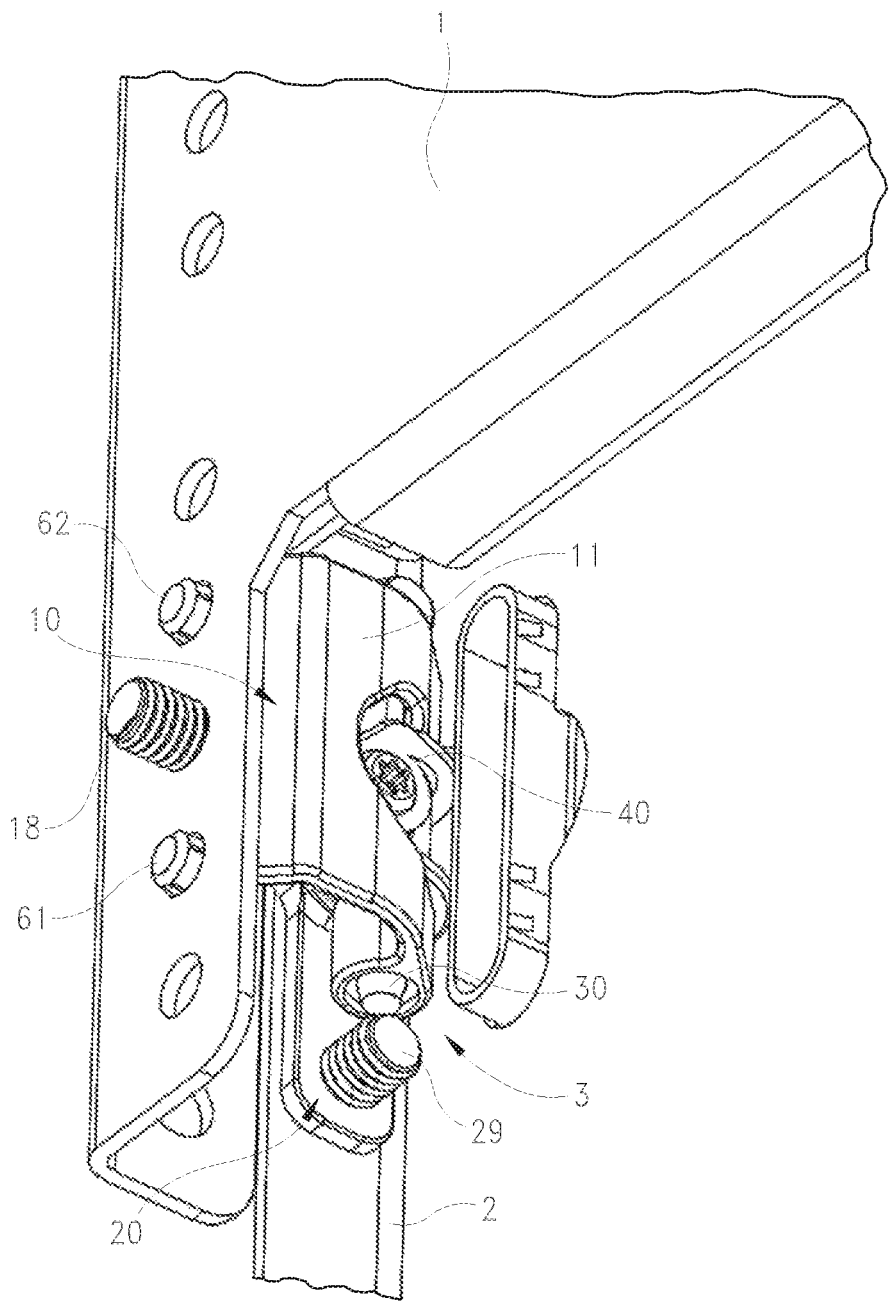
FIG. 1 is a perspective view of a detail of an electrical cabinet, in particular an electrical cabinet for low-voltage switchboards, according to the invention.

With reference to the attached figures, the electrical cabinet, in particular an electrical cabinet for low-voltage switchboards, of the present invention, in its more general definition, comprises a frame 1 that defines an internal space and an openable door 2 for accessing said internal space.

The door 2 is hingedly attached to said frame by hinging means 3 which comprises at least a frame hinge 10 fixed to the frame 1 of the cabinet and a corresponding door hinge 20 fixed to said door 2.

Figure 2:
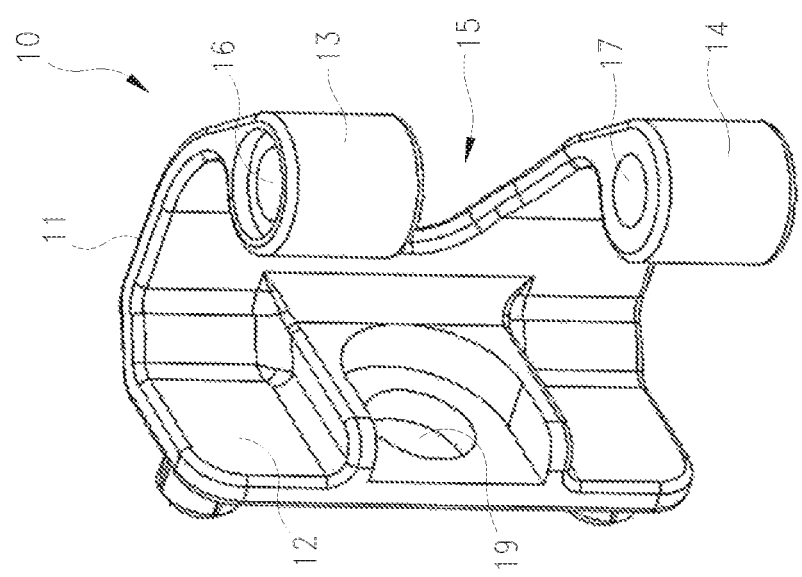
FIG. 2 is a perspective view of a first embodiment of a first component of a hinging system in an electrical cabinet according to the invention.

With particular reference to FIGS. 1 and 2, one of the distinguishing features of the electrical cabinet of the present invention is given by the fact that said frame hinge 10 comprises a first shaped body 11 which is provided with a first fixing plate 12 fixed to the frame 1 of the cabinet. A first 13 and a second 14 hinge wings protrude from said first fixing plate 12 opposite to said frame 1 and form an insertion window 15 in said first shaped body 11.

The first 13 and second 14 hinge wings are respectively provided with a first 16 and a second 17 seat which are aligned in a direction parallel to said first fixing plate 12 and which are positioned at the end of said insertion window 15. Purpose and functions of said first 16 and a second 17 seats will be better described hereinafter.

Figure 3:
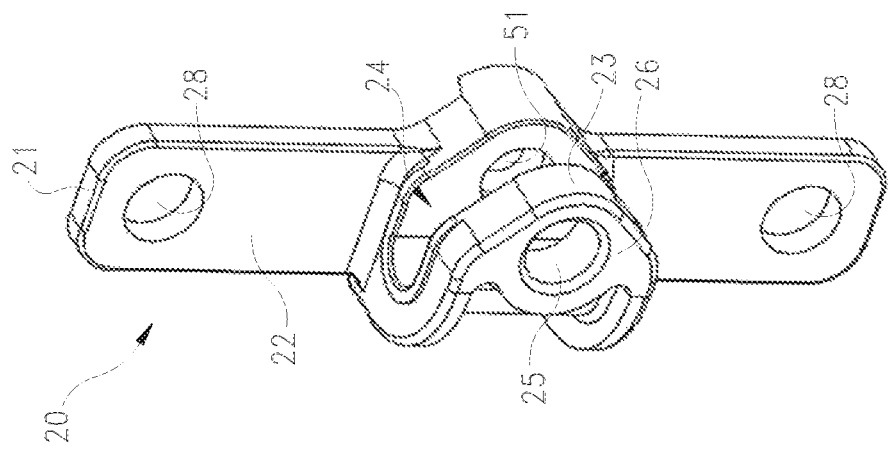
FIG. 3 is a perspective view of a second component of a hinging system in an electrical cabinet according to the invention.

Then, with particular reference to FIGS. 1 and 3, a further distinguishing features of the electrical cabinet of the present invention is given by the fact that said door hinge 20 comprises a second shaped body 21 which is provided with a second fixing plate 22 fixed to said door 2.

A third hinge wing 23 protrudes from said second fixing plate 22 opposite to said door 2 and forms a housing space 24 in the second shaped body 21 of the door hinge 20. Said third hinge wing 23 is conveniently provided with a third seat 25, whose function will be better described hereinafter.

Figure 6:
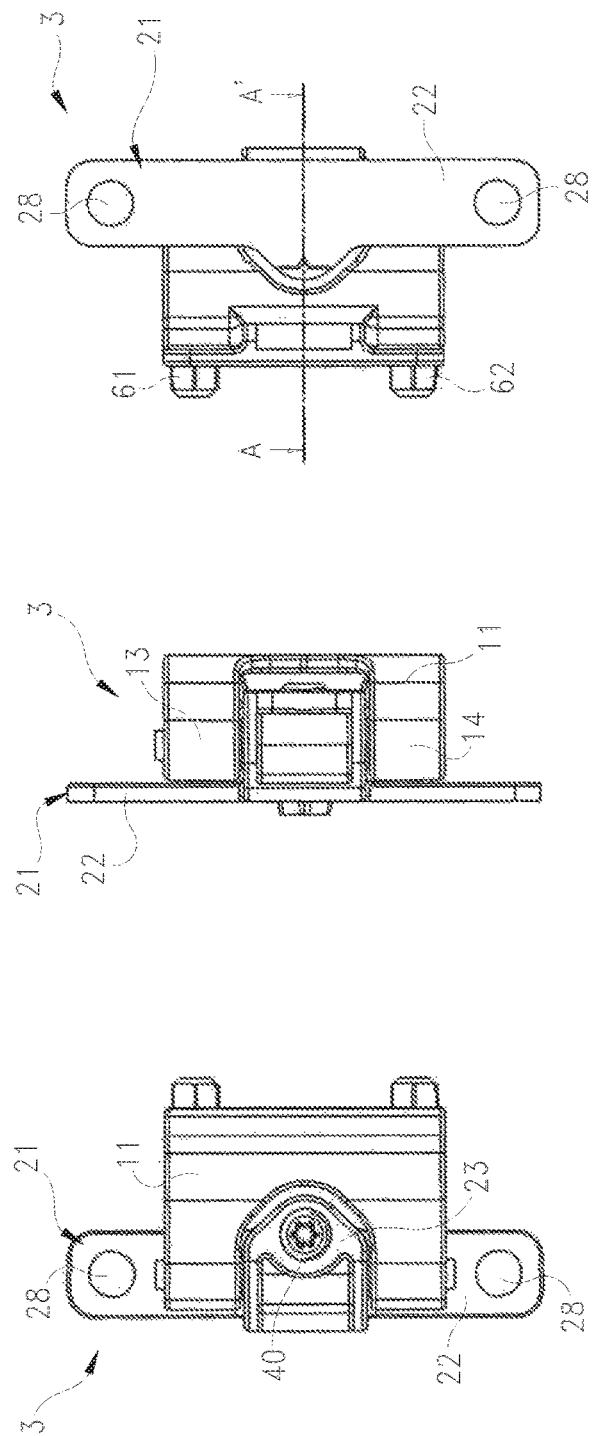
FIG. 6 shows three side views, a perspective view, and a section view of a first embodiment of a hinging system in an electrical cabinet according to the invention.
Figure 6:
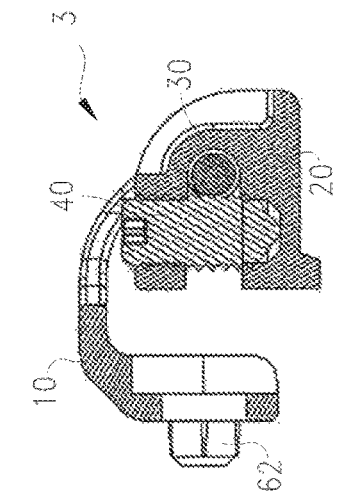
Figure 6:
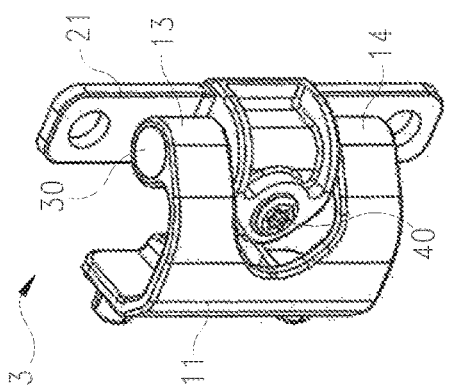
Figure 7:
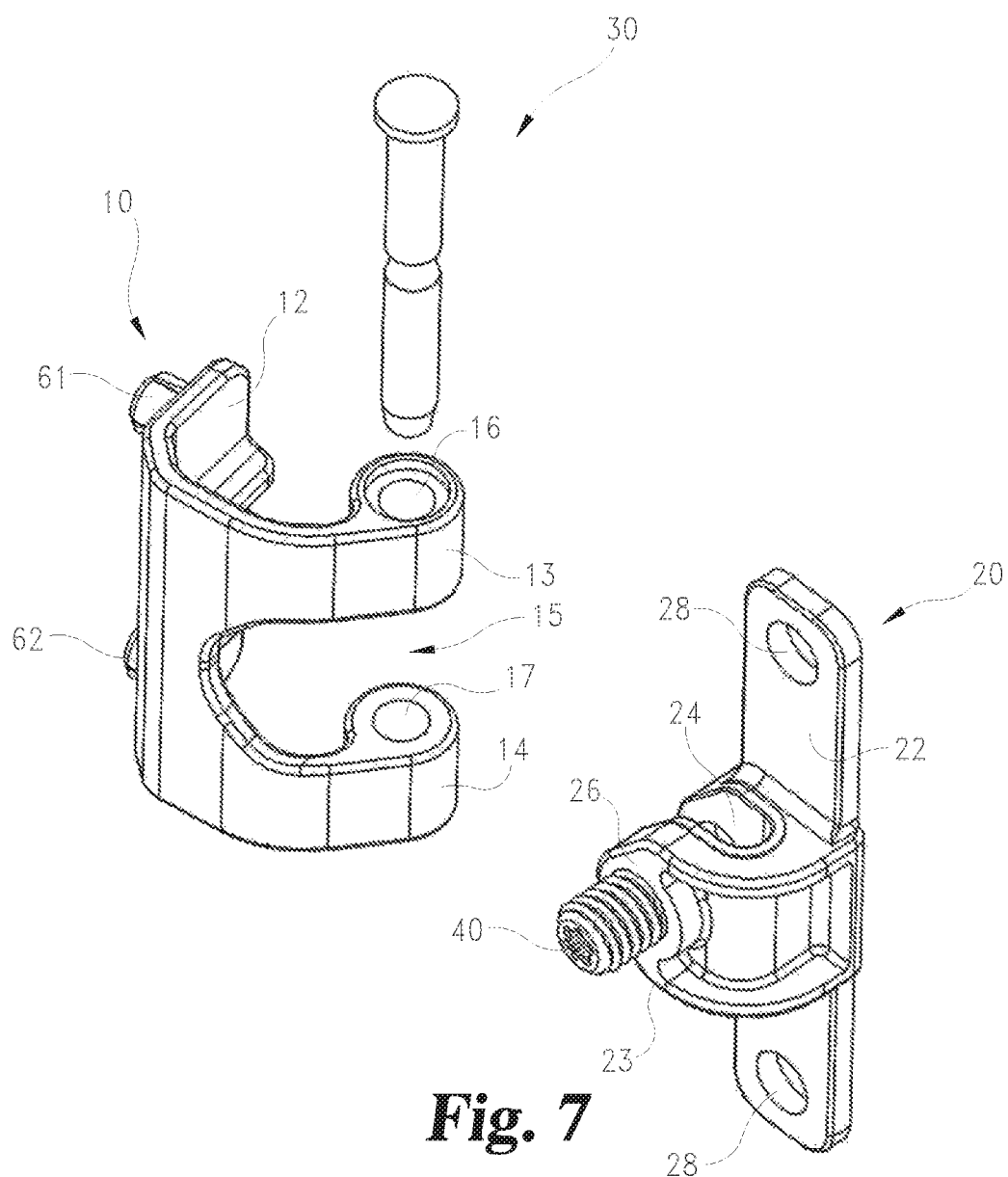
FIG. 7 shows an exploded view of a hinging system in an electrical cabinet according to the invention.
Figure 8:
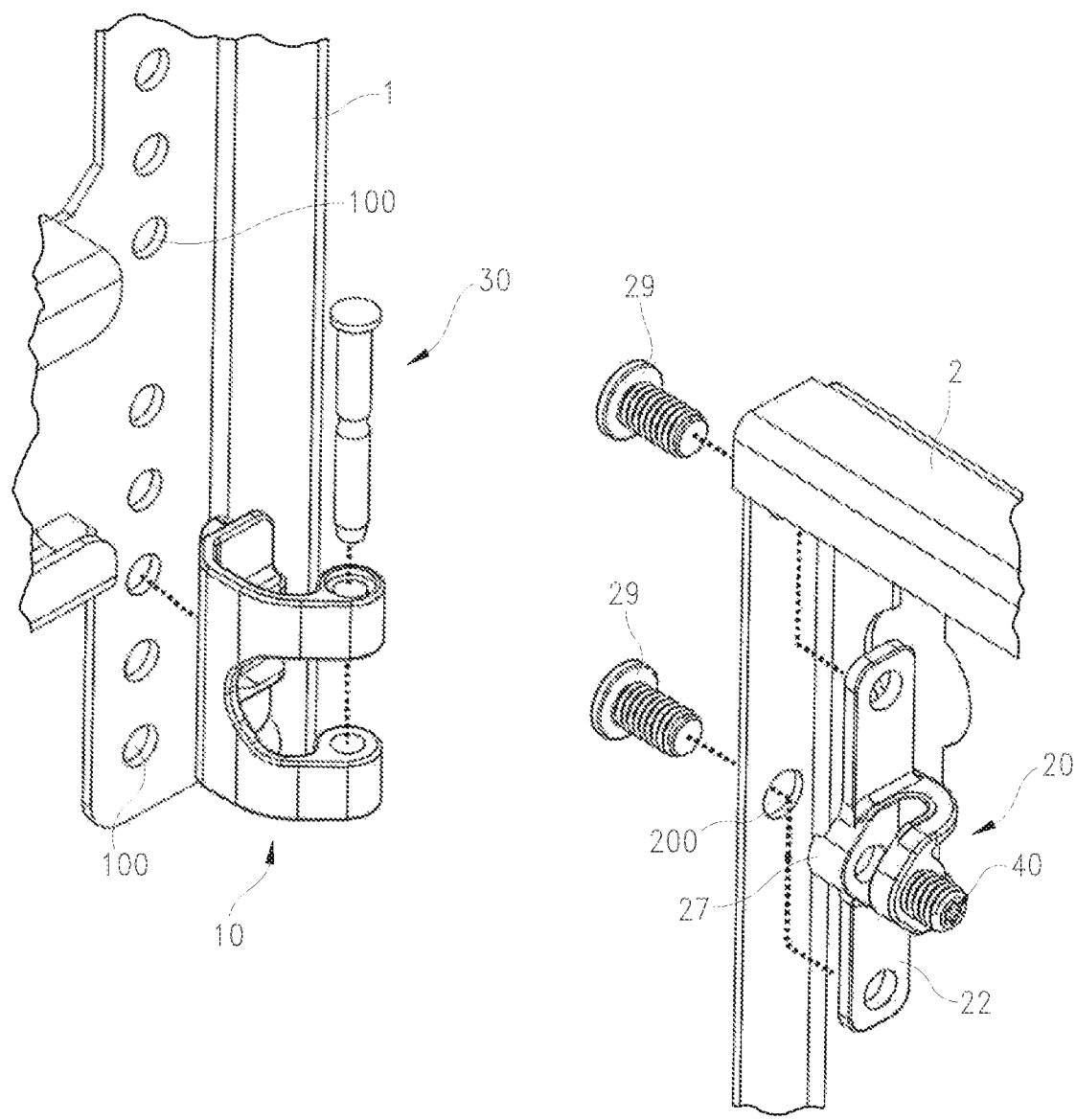
FIG. 8 is a perspective view of a first assembly sequence of a hinging system in an electrical cabinet according to the invention.

With particular reference to FIGS. 1 and 6, in the final assembled position, said third hinge wing 23 is inserted into said insertion window 15 of said first shaped body 11.

Figure 5:
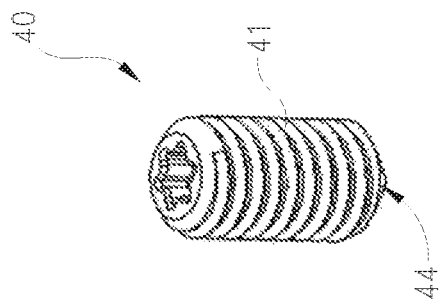
FIG. 5 is a perspective view of a fourth component of a hinging system in an electrical cabinet according to the invention.
Figure 4:
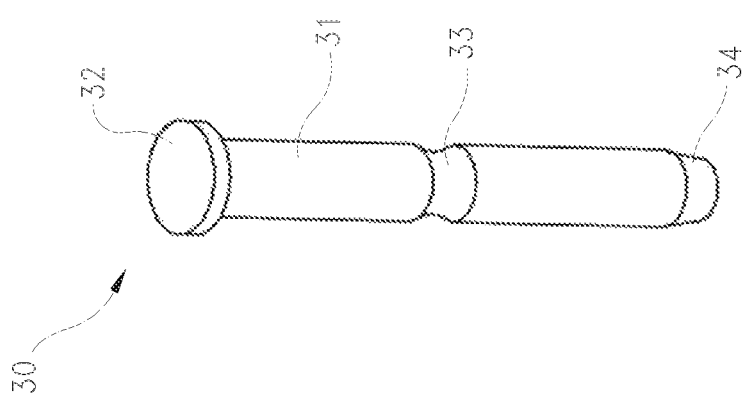
FIG. 4 is a perspective view of a third component of a hinging system in an electrical cabinet according to the invention.

With particular reference to FIGS. 1, 4 and 5, a further distinguishing feature of the electrical cabinet of the present invention is given by the fact that said hinging means 3 further comprises a first hinge pin 30 which is inserted into said first 16 and second 17 seats of said first 13 and second 14 hinge wings and closes said insertion window 15.

Then, the hinging means 3 further comprises first blocking means 40 which are inserted into said third seat 25 of said third hinge wing 23 in a direction substantially perpendicular to said first hinge pin 30. In particular, said first blocking means 40 close said housing space 24 in said second shaped body 21 and lock said first hinge pin 30.

Figure 14:
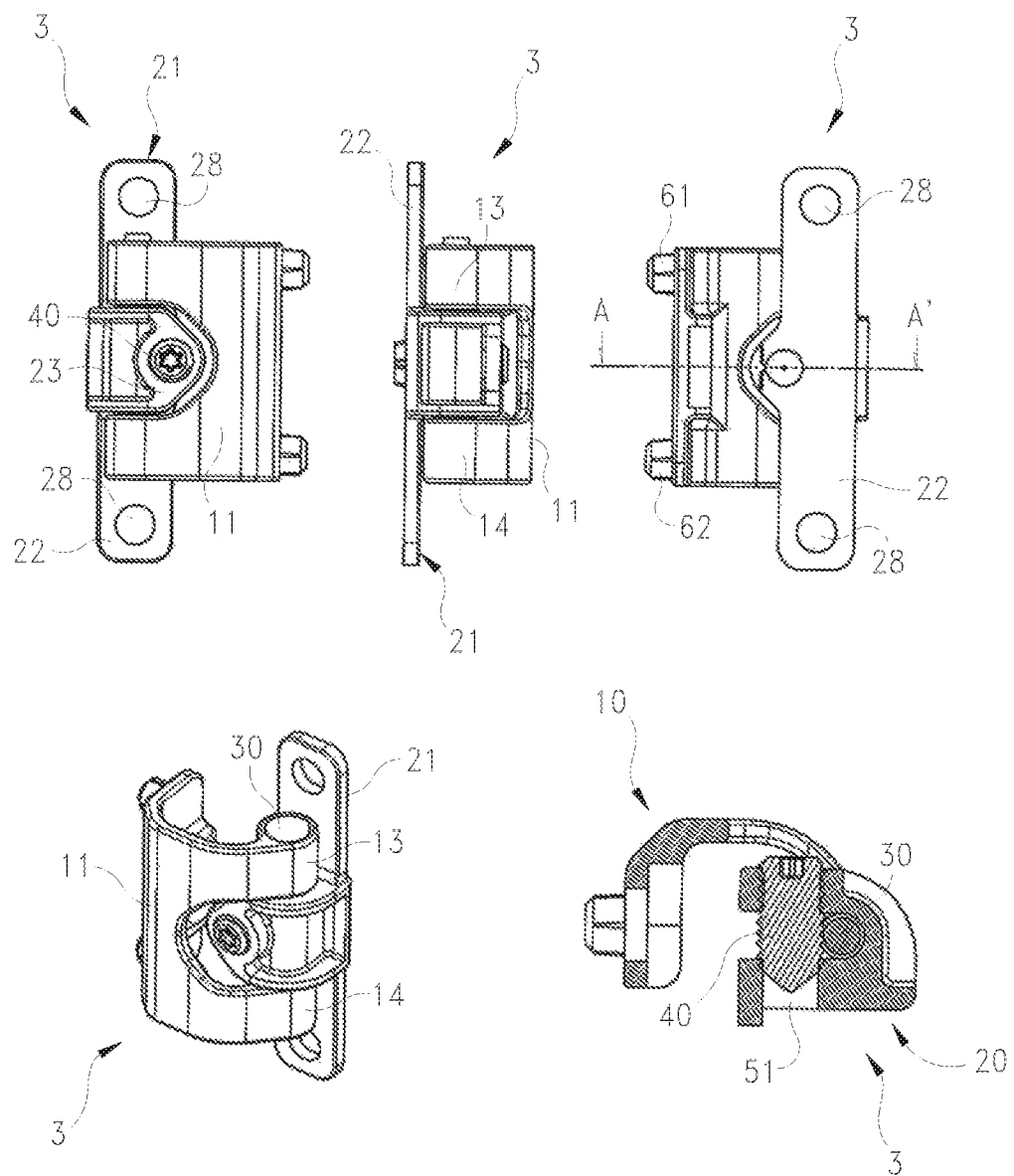
FIG. 14 shows three side views, a perspective view, and a section view of an alternative embodiment of a hinging system in an electrical cabinet according to the invention.

In practice, with reference to FIGS. 1, 6 and 14, in the final assembled position, the third hinge wing 23 wraps around the first hinge pin 30 which is housed in the housing space 24 of the second shaped body 21 of the door hinge 20. The first blocking means 40 prevent the separation of the third hinge wing 23 from the insertion window 15 and helps keeping the first hinge pin 30 in the inserted position into the first 16 and second 17 seats of said first 13 and second 14 hinge wings. It this way, the door hinge 20 is secured to the frame hinge 10 and maintains a freedom to rotate with respect to it, thereby allowing closing and opening of the door 2 with respect to the frame 1 of the cabinet.

Thanks to their symmetrical layout, the frame hinge 10 and the door hinge 20 can be mounted on either side of the frame 1, thereby allowing left-opening or right opening of the door 2 with respect to the frame 1 of the cabinet.

With particular reference to FIG. 2, in a typical embodiment of the electrical cabinet of the present disclosure, the frame hinge 10 is substantially C shaped and has a cut-out portion between said first 13 and second 14 hinge wing.

In the embodiment shown in the attached FIG. 2, said first 16 and second 17 seats of said first 13 and second 14 hinge wings are first and second through-holes respectively formed in said first 13 and second hinge wing 14.

Figure 13:
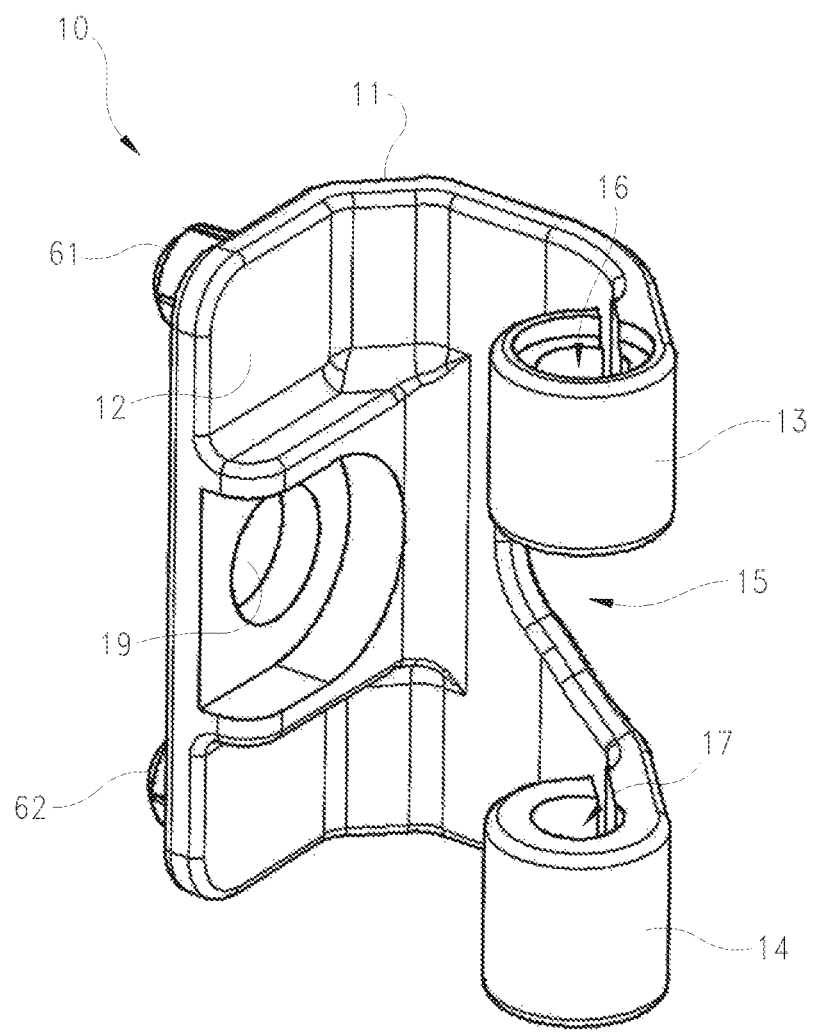
FIG. 13 is a perspective view of a second embodiment of a first component of a hinging system in an electrical cabinet according to the invention.

In an alternative embodiment shown in the attached FIG. 13, the first 16 and second 17 seat are formed by wrapping the terminal portions of said first 13 and second 14 hinge wings around a wrapping axis which extends along the same direction of the fixing plate 12 and which is substantially parallel to said fixing plate 12. In this way, the resulting first 16 and second 17 seat have a substantially cylindrical shape and are aligned to each other along the direction of said wrapping axis.

With reference to FIGS. 1 and 7-10, the frame hinge 10 conveniently comprises first fixing means 18, 19 positioned on said first fixing plate 12 and connecting said frame hinge 10 to the frame 1 of said electrical cabinet. In practice, fixing of the frame hinge 10 to the frame 1 of the cabinet can be carried out by using screw means 18 (or corresponding quick fixing means) inserted in suitable holes 100 of the frame 1 as well as into corresponding holes 19 of the first shaped body 11 of the frame hinge 10.

Moreover, in order to make easier and faster the positioning and fixing of the frame hinge 10 during the assembly operations, the first fixing plate 12 of the frame hinge 10 comprises centering means, such as one or more centering protrusions 61 and 62, which engage corresponding holes 100 formed in the frame 1 of the cabinet.

In this way, as shown in the attached figures, the frame hinge 10 is mechanically connected to the frame 1 at more than one point, thereby increasing the mechanical stability of the connection. In practice, the protrusions 61 and 62 provide an additional anti-rotation feature which makes easier the installation and increases the mechanical stability of the system. For instance, in the example shown there are three point of connections (given by the protrusion 61, 62 and the fixing means 18 inserted into corresponding holes 100), but the number and kind of connections can be different according to the needs.

With particular reference to FIG. 3, the third hinge wing 23 of the door hinge 20 protrudes from the second fixing plate 22 and is shaped so as to have a distal end which is fixed on said second fixing plate 22 and with a terminal end 26 which is flattened and substantially parallel to said second fixing plate 22. A housing space 24 is then formed into said second shaped body 21 between said second fixing plate 22 and the terminal end 26 of said third hinge wing 23, so that the first hinge pin 30 can be conveniently housed inside it, as shown e.g. in FIGS. 1 and 6.

Preferably, the third seat 25 formed in said third hinge wing 23 of the door hinge 20 is a third through hole formed in the terminal end 26 of said third hinge wing 23.

With reference to FIGS. 1 and 7-10, the door hinge 20 conveniently comprises second fixing means 28, 29 which are positioned on said second fixing plate 22 and connect said door hinge 20 to the door 2 of said electrical cabinet. In practice, fixing of the door hinge 20 to the door 2 of the cabinet can be carried out by using screw means 29 (or corresponding quick fixing means) inserted in suitable holes 200 of the door 2 as well as into corresponding holes 28 of the second shaped body 21 of the door hinge 20.

Figure 9:
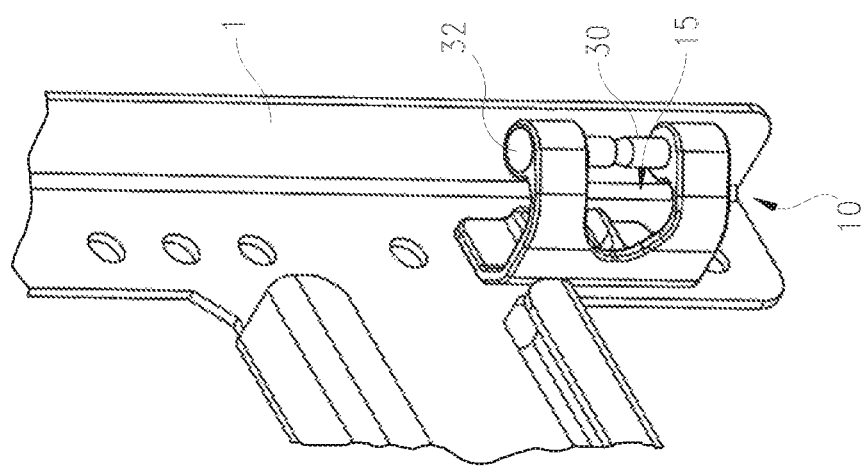
FIG. 9 is a perspective view of a partially assembled hinging system in an electrical cabinet according to the invention.
Figure 9:
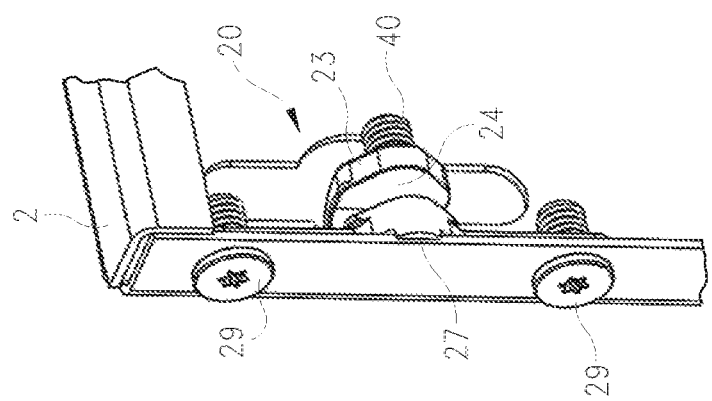

As shown, e.g., in FIG. 9, in a particular embodiment of the electrical cabinet, according to the present invention, the hinging system 3 can be provided with grounding means for the panel. For instance, the door hinge 20 can be provided with a tip 27 protruding onto the edge of the door 2 to create the panel grounding. In practice, the tip 27 has a scratching function onto the isolating coating (whenever present) to provide a metal/metal contact between the parties.

With particular reference to FIG. 4, the first hinge pin 30 can have a substantially cylindrical body 31 and can be provided with an enlarged head 32. It this way, the insertion of said first hinge pin 30 into said first 16 and second 17 seats of said first 13 and second 14 hinge wings is made easier. At the same time, thanks to the enlarged head 32, the first hinge pin 30 can be easily maintained in place.

In the embodiment shown, the first hinge pin 30 has a tapered portion 33 in an intermediate position of said substantially cylindrical body 31, between said enlarged head 32 and the opposite end 34.

As shown on FIGS. 1 and 6, in the final assembled position, the first blocking means 40 are at least partially positioned in the tapered portion 33 of the substantially cylindrical body 31 of said first hinge pin 30, so as to engage the first hinge pin 30 in correspondence of the tapered portion 33 and locking it into its inserted position in the first 16 and second 17 seats of said first 13 and second 14 hinge wings.

With particular reference to FIG. 5, said first blocking means 40 can conveniently comprise a socket set screw 41. In such a case, the third seat 25 formed into said third hinge wing 23 is a threaded third through hole.

Figure 11:
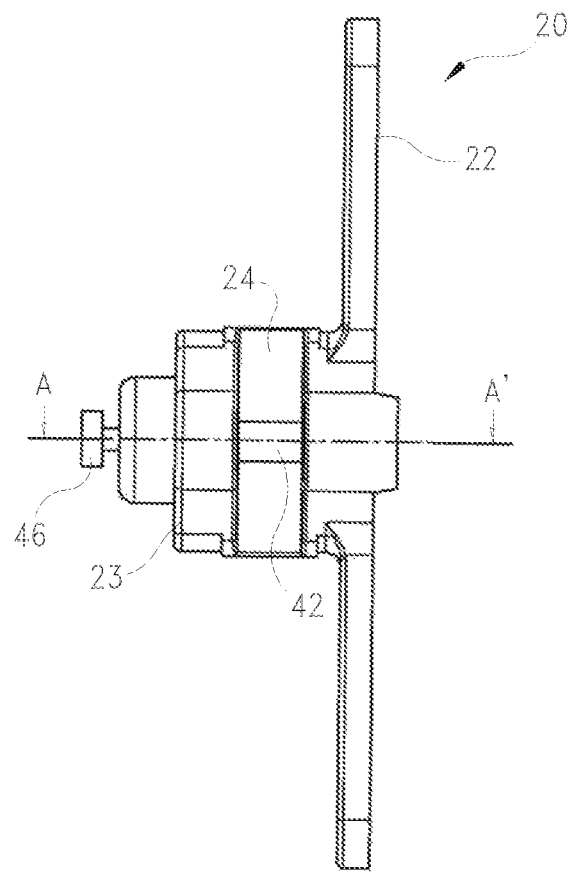
FIG. 11 is a side view of s second embodiment of a hinging system in an electrical cabinet according to the invention.
Figure 12:
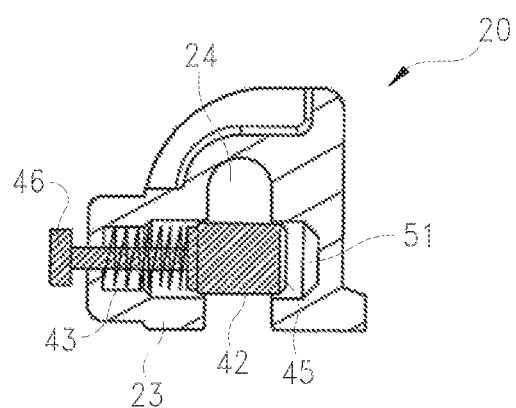
FIG. 12 is a section view of s second embodiment of a hinging system in an electrical cabinet according to the invention.

Alternatively, with reference to FIGS. 11 and 12, said first blocking means 40 can conveniently comprise a second hinge pin 42 and a spring 43 which are positioned in said third hinge wing 23. In this way, the second hinge pin 42 of the hinge system 3 is pushed and maintained into position by said spring means 43, thereby making even easier and faster the assembly of the electrical cabinet according to the present invention. The second hinge pin 42 is conveniently provided with a head 46 which protrudes outside the third hinge wing 23 for the actuation of said second hinge pin 42.

In practice, by pulling the head 46 of the second hinge pin 42 against the action of the spring 43, it is possible to free the entrance of the housing space 24 thereby allowing the positioning of the third hinge wing 23 into the insertion window 15 and around the first hinge pin 30. The head 46 of the second hinge pin 42 is then released so that second hinge pin 42 is pushed by the spring 43 into the operating position where it blocks any movement of the first hinge pin 30 and any relative movement of the door 2 with respect of the frame 1.

With particular reference to FIGS. 3 and 6, in a particular embodiment of the presently disclosed cabinet, said door hinge 2 is conveniently provided with a fourth seat 51 which is aligned with said third seat 25 in a direction substantially perpendicular to said first hinge pin 30. The fourth seat 51 is conveniently shaped so as to house a terminal end 44, 45 of said first blocking means 40, for instance a terminal end 44 of the socket set screw 41 or a terminal end 45 of the second hinge pin 42.

With reference to FIG. 14, in a particularly preferred embodiment of the presently disclosed cabinet, said fourth seat 51 is a fourth through hole which is made into said door hinge 2 and which is aligned with said third seat 25 in a direction substantially perpendicular to said first hinge pin 30.

With reference to FIGS. 1 and 7 to 10, the assembly sequence of a hinging system in an electrical cabinet according to the present invention can be described as follows.

The socket set screw 41 is pre-installed into the third seat 25 formed in the third hinge wing 23 of the door hinge 20. The door hinge 20 is fixed to the door 2 using the second fixing means 29 inserted into the corresponding holes 28 and 200.

Correspondingly, the frame hinge 10 is fixed to the frame 1 of the cabinet by using the centering means 61, 62 and the first fixing means 18 inserted into the corresponding holes 100 and 19. The first hinge pin 30 is then inserted into the first 16 and second 17 seats of said first 13 and second 14 hinge wings, thereby having the preassembled situation of FIG. 9.

Figure 10:
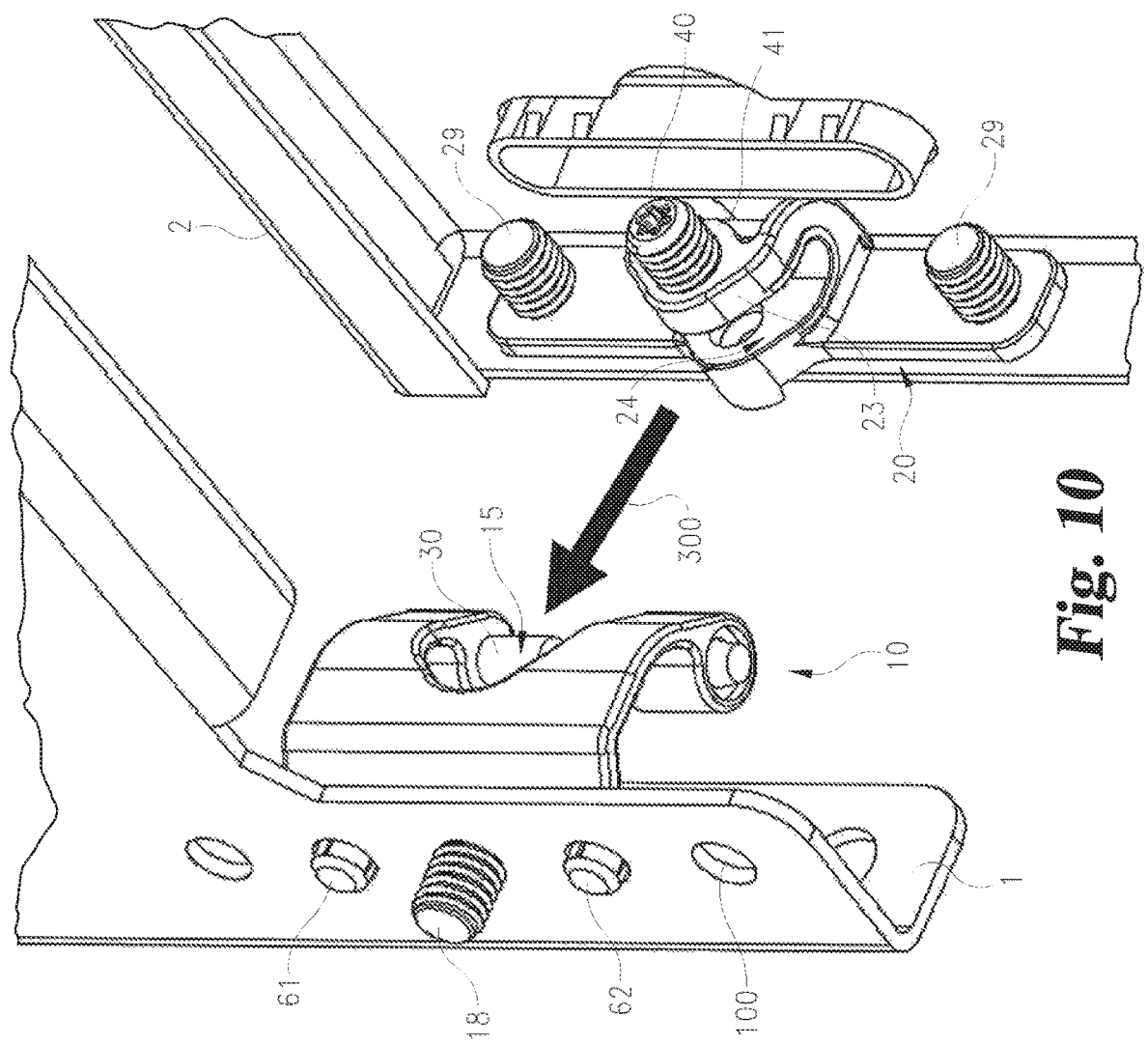
FIG. 10 is a perspective view of a second assembly sequence of a hinging system in an electrical cabinet according to the invention.

At this point, with reference to FIG. 10, the door 2 is attached to the frame 1 by inserting the third hinge wing 23 into the insertion window 15 along the direction of the arrow 300. Once the door 2 in place, the socket set screw 41 is locked so as to block any movement of the first hinge pin 30 and any relative movement of the door 2 with respect of the frame 1, but maintaining the free rotation of the door 2 with respect of the frame 1, as represented in the final assembled position of FIG. 1.

The procedure is substantially the same when the socket set screw 41 is replaced by the system comprising the second hinge pin 42 and the spring 43 previously described.

It is clear from the above description that the electrical cabinet for low-voltage switchboards of the present invention, fully achieve the intended aims and solved the above-highlighted problems of the existing electrical cabinets.

Several variations can be made to the electrical cabinet for low-voltage switchboards thus conceived all falling within the scope of the attached claims. In practice, the materials used (e.g. steel, zamak/zama) and the contingent dimensions and shapes can be any, according to requirements and to the state of the art.

The invention claimed is:

1. An electrical cabinet, in particular an electrical cabinet for low-voltage switchboards, comprising a frame that defines an internal space and an openable door for accessing said internal space hingedly attached to said frame by hinging means, said hinging means comprising:
   at least a frame hinge fixed to said frame and a corresponding door hinge fixed to said door, wherein said frame hinge comprises:
      a first shaped body having a first fixing plate fixed to said frame, a first and a second hinge wings protruding from said first fixing plate opposite to said frame and forming an insertion window in said first shaped body, said first and second hinge wings having respectively a first and a second seat aligned in a direction parallel to said first fixing plate and positioned at the end of said insertion window;
      a second shaped body having a second fixing plate fixed to said door, a third hinge wing protruding from said second fixing plate opposite to said door, said third hinge wing having a terminal end substantially parallel to said second fixing plate and forming a housing space in said second shaped body, said third hinge wing being inserted into said insertion window of said first shaped body and being provided with a third seat; and
   said hinging means further comprising a first hinge pin inserted into said first and second seats of said first and second hinge wings and closing said insertion window, said hinging means further comprising first blocking means inserted into said third seat of said third hinge wing in a direction substantially perpendicular to said first hinge pin, said first blocking means closing said housing space in said second shaped body and blocking said first hinge pin, wherein said first hinge pin has a substantially cylindrical body extending from a head at one end to an opposite end, said cylindrical body including a tapered portion in an intermediate position of said substantially cylindrical body between said head and said opposite end, wherein said head is enlarged relative to said cylindrical body.

2. The electrical cabinet, according to claim 1, wherein said frame hinge is substantially C shaped with a cut-out portion between said first and second hinge wing.

3. The electrical cabinet, according to claim 1, wherein said first and second seats of said first and second hinge wings are first and second through-holes respectively formed in said first and second hinge wing.

4. The electrical cabinet, according to claim 1, wherein said first and second seats of said first and second hinge wings are formed by wrapping the terminal portions of said first and second hinge wings around a wrapping axis which extends along the same direction and parallel to said fixing plate.

5. The electrical cabinet, according to claim 1, wherein said frame hinge comprises first fixing means positioned on said first fixing plate and connecting said framehinge to the frame of said electrical cabinet.

6. The electrical cabinet, according to claim 1, wherein said terminal end of said third hinge wing is flattened.

7. The electrical cabinet, according to claim 1, wherein said third seat is a third through hole formed in said third hinge wing.

8. The electrical cabinet, according to claim 1, wherein said third seat is a third through hole formed in said third hinge wing; and wherein said third through hole is formed in the terminal end of said third hinge wing.

9. The electrical cabinet, according to claim 1, wherein said door hinge comprises second fixing means positioned on said second fixing plate and connecting said door hinge to the door of said electrical cabinet.

10. The electrical cabinet, according to claim 1, wherein said first blocking means are at least partially positioned in the tapered portion of the substantially cylindrical body of said first hinge pin.

11. The electrical cabinet, according to claim 1, wherein said first blocking means comprises a socket set screw and in that said third seat is a threaded third through hole formed in said third hinge wing.

12. The electrical cabinet, according to claim 1, wherein said first blocking means comprises a second hinge pin and a spring positioned in said third hinge wing, said second hinge pin including a head protruding outside said third hinge wing for actuation of said second hinge pin, wherein pulling of said head against said spring displaces said second hinge pin to open said housing space for insertion of said third hinge wing into said insertion window and around said first hinge pin, and said spring pushes said second hinge pin to block said first hinge pin upon release of said head.

13. The electrical cabinet, according to claim 1, wherein said door hinge is provided with a fourth seat aligned with said third seat in a direction substantially perpendicular to said first hinge pin and housing a terminal end of said first blocking means.

14. The electrical cabinet, according to claim 2, wherein said first and second seats of said first and second hinge wings are first and second through-holes respectively formed in said first and second hinge wing.

15. The electrical cabinet, according to claim 2 wherein said first and second seats of said first and second hinge wings are formed by wrapping the terminal portions of said first and second hinge wings around a wrapping axis which extends along the same direction and parallel to said fixing plate.

16. The electrical cabinet, according to claim 2, wherein said frame hinge comprises first fixing means positioned on said first fixing plate and connecting said framehinge to the frame of said electrical cabinet.

17. The electrical cabinet, according to claim 2, wherein said third hinge wing of said door hinge has a terminal end substantially parallel to said second fixing plate.

18. The electrical cabinet, according to claim 2, wherein said door hinge is provided with a fourth seat aligned with said third seat in a direction substantially perpendicular to said first hinge pin and housing a terminal end of said first blocking means.

19. The electrical cabinet, according to claim 1, further comprising a tip protruding from said second fixing plate that protrudes onto an edge of said door for grounded engagement with said door.

20. The electrical cabinet, according to claim 19, wherein:
   said third hinge wing of said door hinge has a terminal end substantially parallel to said second fixing plate and said third seat is a third through hole formed in said terminal end of said third hinge wing;

said door hinge includes a fourth seat aligned with said third seat in a direction substantially perpendicular to said first hinge pin for housing a terminal end of said first blocking means; and said tip protrudes from said second fixing plate at said fourth seat.

\* \* \* \* \*